United States Patent
Kawana et al.

(10) Patent No.: US 9,588,509 B2
(45) Date of Patent: Mar. 7, 2017

(54) CORRECTION METHOD AT TIME OF FEED AXIS REVERSAL

(75) Inventors: Akira Kawana, Kanagawa (JP); Norio Mori, Kanagawa (JP); Mitsunari Oda, Kanagawa (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 395 days.

(21) Appl. No.: 13/823,797

(22) PCT Filed: Oct. 26, 2011

(86) PCT No.: PCT/JP2011/074722
§ 371 (c)(1),
(2), (4) Date: Mar. 15, 2013

(87) PCT Pub. No.: WO2012/057231
PCT Pub. Date: May 3, 2012

(65) Prior Publication Data
US 2013/0173046 A1  Jul. 4, 2013

(30) Foreign Application Priority Data
Oct. 27, 2010 (JP) .................... 2010-241212

(51) Int. Cl.
*G05B 19/18* (2006.01)
*G05B 19/404* (2006.01)

(52) U.S. Cl.
CPC ......... *G05B 19/182* (2013.01); *G05B 19/404* (2013.01); *G05B 2219/41078* (2013.01);
(Continued)

(58) Field of Classification Search
CPC ............. G05B 19/182; G05B 19/404; G05B 2219/41078; G05B 2219/41084; G05B 2219/41115
(Continued)

(56) References Cited

U.S. PATENT DOCUMENTS 4,988,935 A * 1/1991 York .................... G05B 19/232
318/561
5,343,132 A * 8/1994 Iwashita ....................... 318/630
(Continued)

FOREIGN PATENT DOCUMENTS

| JP | 6421609 A | 1/1989 |
|----|-----------|--------|
| JP | 09288508 A | 11/1997 |
| JP | 2875646 B2 | 3/1999 |

*Primary Examiner* — Kenneth M Lo
*Assistant Examiner* — Michael J Huntley
(74) *Attorney, Agent, or Firm* — Paul & Paul

(57) ABSTRACT

A stick motion correction method which corrects stick motion which occurs at time of reversal of a feed axis of a numerical control machine tool stores a position command to be commanded to a servo motor from an NC program of a numerical control machine tool for each predetermined control period from a current position command to a later position command, calculates a reversal correction command based on the stored position commands, calculates an advancement time for advancing timing of addition of the reversal correction command to a speed or torque command of the motor from reversal timing of the servo motor, based on information obtained from operation of the motor and adds the reversal correction command to the speed or torque command of the servo motor to precisely correct stick motion at a timing advanced from the reversal timing of the servo motor by an exact time.

1 Claim, 6 Drawing Sheets

(52) U.S. Cl.
CPC .............. *G05B 2219/41084* (2013.01); *G05B 2219/41115* (2013.01)

(58) Field of Classification Search
USPC ........................................................ 700/186
See application file for complete search history.

(56) References Cited

U.S. PATENT DOCUMENTS

| | | | |
|---|---|---|---|
| 5,767,645 A * | 6/1998 | Park ............................. | 318/560 |
| 6,060,854 A * | 5/2000 | Yutkowitz ............ | G05B 19/404 |
| | | | 318/574 |
| 6,107,771 A * | 8/2000 | Maeda ......................... | 318/630 |
| 7,450,127 B2 * | 11/2008 | Hong ...................... | G05B 19/41 |
| | | | 318/569 |
| 7,560,890 B2 * | 7/2009 | Terada et al. ................. | 318/630 |
| 8,082,048 B2 * | 12/2011 | Eguchi ............................ | 700/70 |
| 8,723,472 B2 * | 5/2014 | Takeuchi et al. ............. | 318/632 |
| 2002/0151988 A1 * | 10/2002 | Shiba .................. | G05B 19/404 |
| | | | 700/13 |

* cited by examiner

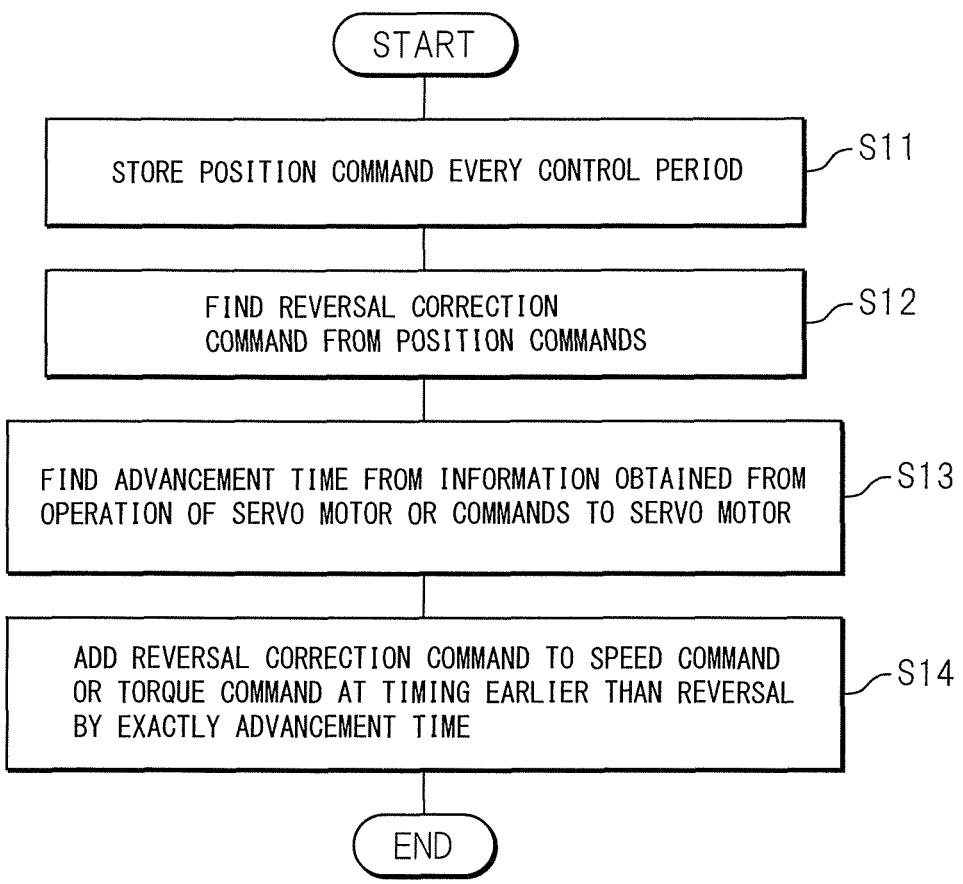

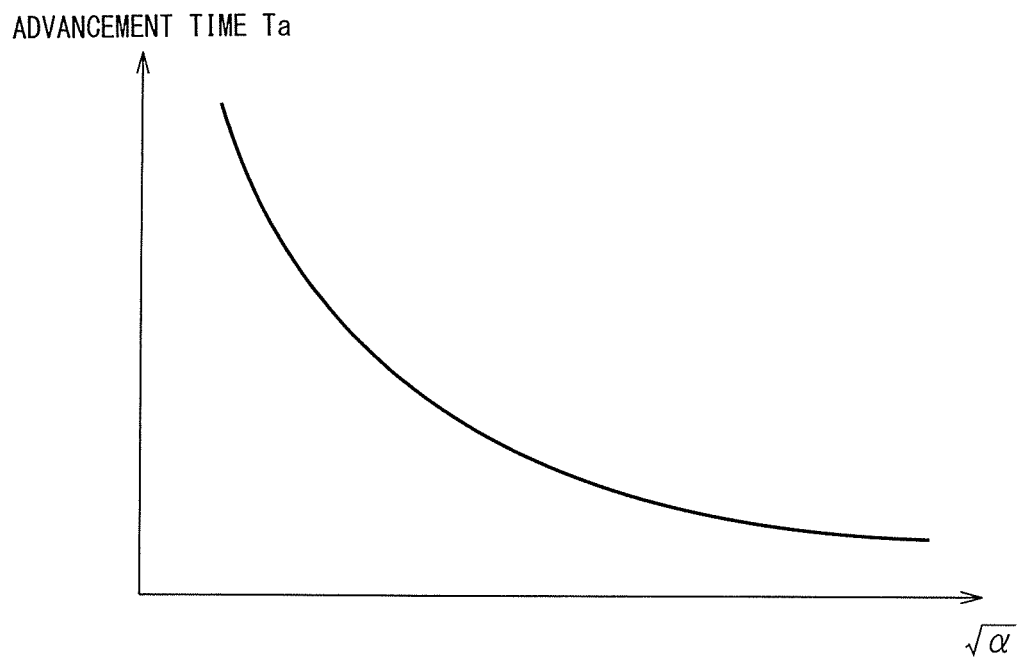

Fig.5b

| POSITION ERROR | ADVANCEMENT TIME |
|---|---|
| $\Delta P_1$ | $Tb_1$ |
| ⋮ | ⋮ |
| $\Delta P_n$ | $Tb_n$ |

Fig.5c

| TORQUE ERROR | ADVANCEMENT TIME |
|---|---|
| $\Delta \tau_1$ | $Tc_1$ |
| ⋮ | ⋮ |
| $\Delta \tau_n$ | $Tc_n$ |

| CURRENT ERROR | ADVANCEMENT TIME |
|---|---|
| $\Delta I_1$ | $Td_1$ |
| $\vdots$ | $\vdots$ |
| $\Delta I_n$ | $Td_n$ |

CORRECTION METHOD AT TIME OF FEED AXIS REVERSAL

TECHNICAL FIELD

The present invention relates to a correction method which corrects stick motion which occurs at the time of reversal of the movement direction in a feed axis of a numerical control machine tool.

BACKGROUND ART

A machine tool includes at least one linear axis and/or rotational feed axis (below, these linear axis and rotational feed axis sometimes being simply called "feed axes"). The motors for driving these feed axes are controlled by a numerical control device. In a machine tool, different tools are attached in accordance with the content of machining of the workpiece. Further, jigs for attaching the workpieces to the machine tool are also designed for the specific workpieces.

In such a machine tool, the work table on which the workpiece is set or the tool is made to move in two mutually perpendicular directions whereby the workpiece is for example made to move along an arc-shaped path. In the case of such machining, sometimes the servo motor for one feed axis is operated while the servo motor for the other feed axis is stopped for an instant and then restarted.

Therefore, the output shaft of the other servo motor changes from a dynamic friction state to a static friction state and then again to a dynamic friction state. Furthermore, at the time of reversal of a servo motor, the effects of backlash and elastic deformation are felt in the transmission system of the servo motor. For this reason, a delay in response occurs in the operation of the other servo motor. This appears in measured values as a stick motion P. For this reason, when cutting a workpiece for example along an arc, the problem arises of the workpiece being excessively cut at the cutting location corresponding to the stick motion P.

To solve this problem, in PLT 1, a correction command is added to a position command to thereby suppress stick motion.

CITATIONS LIST

Patent Literature

PLT 1: Japanese Patent No. 2875646

SUMMARY OF INVENTION

Technical Problem

Here, the correction command is preferably added before reversal. The reason is that in the case of a feed axis driven by a ballscrew, part of the mechanical system, which is deemed an elastic element, causes lost motion. To compensate for this, operation is necessary before a command.

In PLT 1, the correction command for stick motion is added earlier than the time of reversal in the range of a control period based on the time of reversal. However, the control period is usually in units of several milliseconds, so at the most there are several milliseconds between the timing for addition of a correction command and the time of reversal. However, a correction command is often preferably added several tens of milliseconds before the time of reversal. Therefore, in PLT 1, despite the timing for addition of the correction command being made earlier, that timing cannot be said to be early enough. Therefore, in the prior art, the situation arose where even if adding a correction command, stick motion still remained.

The present invention was made in consideration of this situation and has as its object the provision of a stick motion correction method which enables stick motion to be corrected with a high precision.

Solution to Problem

To achieve the above-mentioned object, according to a first aspect of the invention, there is provided a stick motion correction method which corrects stick motion which occurs at the time of reversal of a movement direction of a feed axis of a numerical control machine tool, which stick motion correction method comprising steps of storing a position command to be commanded to a servo motor from an NC program of the numerical control machine tool for each predetermined control period from a current position command to a position command after a predetermined time, calculating a reversal correction command based on the stored position commands, calculating an advancement time for advancing a timing of addition of the reversal correction command to a speed command or torque command of the servo motor from the reversal timing of the servo motor based on information obtained from operation of the servo motor or commands to the servo motor, and adding the reversal correction command to the speed command or torque command of the servo motor to correct stick motion at a timing advanced from the reversal timing of the servo motor by exactly the advancement time.

According to a second aspect of the invention, there is provided the first aspect of the invention wherein the information obtained from operation of the servo motor or commands to the servo motor is acceleration which is found from a plurality of the position commands which are stored in the storage unit.

According to a third aspect of the invention, there is provided the first aspect of the invention wherein the information obtained from operation of the servo motor is position error between the position commands and an actual position of the servo motor.

According to a fourth aspect of the invention, there is provided any one of the first to third aspects of the invention wherein further the advancement time is adjusted based on at least one of torque error between a torque command and actual torque of the servo motor and current error between a current command and actual current of the servo motor.

Advantageous Effects of Invention

In the first aspect of the invention, information obtained from the operation of the servo motor or commands to the servo motor is used as the basis to calculate an advancement time advanced from the reversal timing of the servo motor and a correction command is added at a timing considering this advancement time. The advancement time can be determined regardless of the control period of the numerical control machine tool, so the timing for addition of the correction command can be set early enough. For this reason, it is possible to correct stick motion with a high precision and possible to improve the quality of the machined surface of a workpiece.

In the second aspect of the invention, the acceleration which is found from a plurality of position commands which are stored in a storage unit, is utilized, so it is possible to find the advancement time simply without requiring any new special information. Note that, it is preferable to find in advance the relationship between a square root of acceleration and the advancement time and determine the advancement time from this relationship.

In the third aspect of the invention, position error which is obtained from the position commands and actual position of the servo motor is used, so it is possible to find the advancement time sufficiently considering the effects of lost motion.

In the fourth aspect of the invention, torque error and/or current error is used to adjust the advancement time. Therefore, it is possible to find the more accurate advancement time considering torque error and/or current error.

BRIEF DESCRIPTION OF DRAWINGS

FIG. 3 is a flow chart for explaining a correction method which corrects stick motion.

FIG. 4 is a view which shows the relationship between a square root of acceleration and advancement time.

FIG. 5a is a view which shows a map of acceleration and advancement time.

FIG. 5b is a view which shows a map of position error and advancement time.

FIG. 5c is a view which shows a map of torque error and advancement time.

DESCRIPTION OF EMBODIMENTS

Below, referring to the attached drawings, embodiments of the present invention will be explained. In the following figures, similar members will be assigned similar reference notations. To facilitate understanding, these figures are suitably changed in scale.

Figure 1:
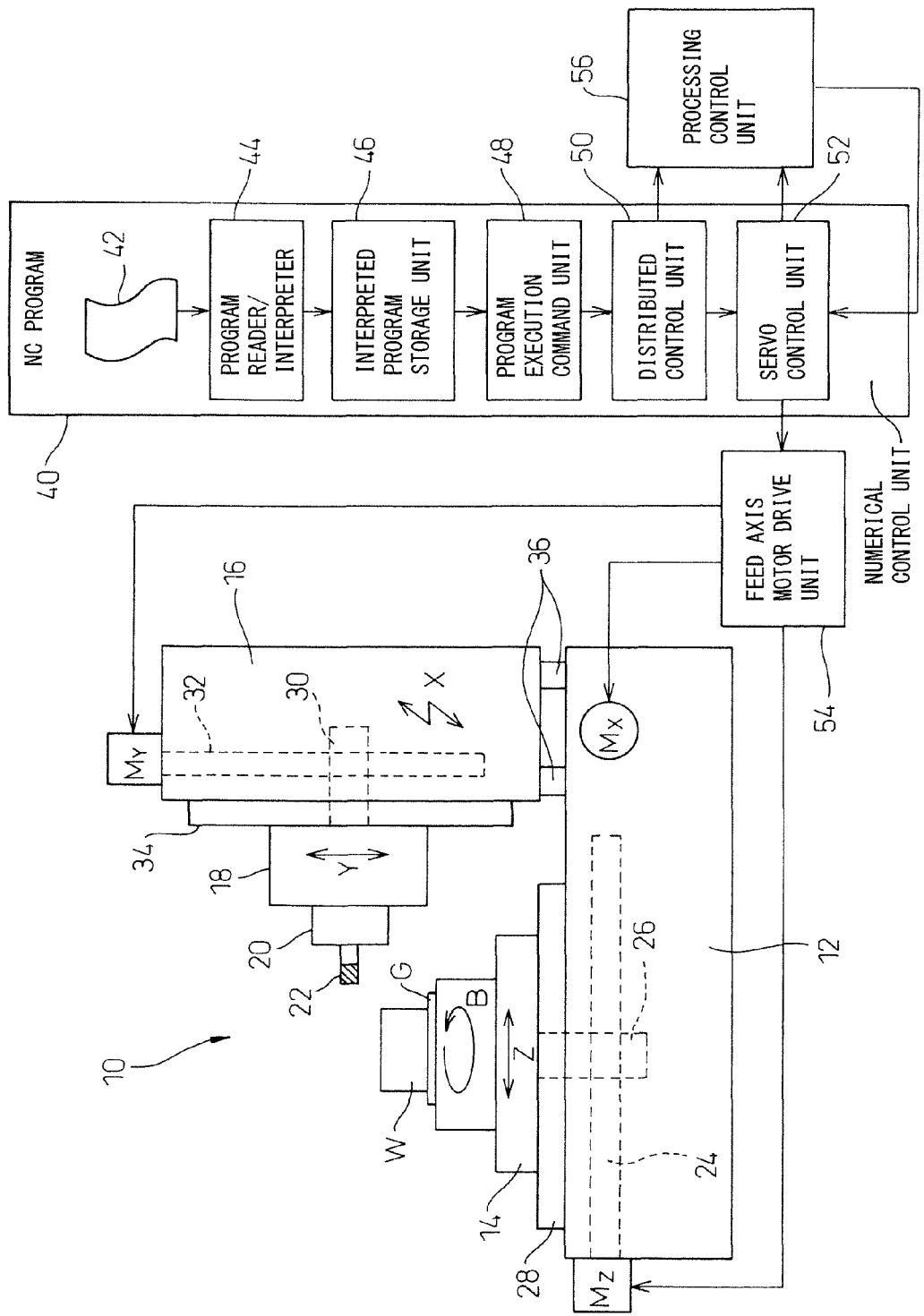
FIG. 1 is a schematic view of a numerical control machine tool of the present invention.

FIG. 1 is a schematic view of a numerical control machine tool of the present invention. In FIG. 1, the numerical control machine tool 10 is a so-called horizontal machining center which is provided with a bed 12 which is placed on the floor of a factory etc. On the top surface of the bed 12, Z-axis guide rails 28 are laid in a horizontal Z-axis direction (left-right direction in FIG. 1). On the Z-axis guide rails 28, a table 14 for fastening a workpiece W via a workpiece jig G is slidably attached. FIG. 1 shows an example of fastening an NC rotary table able to rotate around a B-axis direction on the table 14 and placing a workpiece W on top of that, but a workpiece W may be directly placed on the table 14 without interposition of an NC rotary table.

On the top surface of the bed 12, further, X-axis guide rails 36 are laid in an X-axis direction which is perpendicular to the Z-axis and horizontal (direction vertical to paper surface in FIG. 1). On the X-axis guide rails 36, a column 16 is slidably attached. At the front surface of the column 16 facing the workpiece W, Y-axis guide rails 34 are laid in a Y-axis direction perpendicular to the X-axis and Z-axis (in FIG. 1, top-bottom direction). On the Y-axis guide rails 34, a spindle head 18 which rotatably supports a spindle 20 is slidably attached.

Inside the bed 12, at the bottom side of the table 14, a Z-axis feed screw 24 is laid in the Z-axis direction. At the bottom surface of the table 14, a nut 26 is fastened which engages with the Z-axis feed screw 24. At one end of the Z-axis feed screw 24, a Z-axis feed servo motor Mz is connected. By driving the Z-axis feed servo motor Mz to make the Z-axis feed screw 24 turn, the table 14 moves along the Z-axis guide rails 28. Similarly, inside the bed 12, at the bottom side of the column 16, an X-axis feed screw (not shown) is laid in the X-axis direction. At the bottom surface of the column 16, a nut (not shown) is fastened which engages with the X-axis feed screw.

At one end of the X-axis feed screw, an X-axis feed servo motor Mx is connected. By driving the X-axis feed servo motor Mx to make the X-axis feed screw turn, the column 16 moves along the X-axis guide rails 36. Further, inside the column 16, a Y-axis feed screw 32 is laid in the Y-axis direction. At the back surface of the spindle head 18, a nut 30 is fastened which engages with the Y-axis feed screw 32. At the top end of the Y-axis feed screw 32, a Y-axis feed servo motor My is connected. By driving the Y-axis feed servo motor My to make the Y-axis feed screw 32 turn, the spindle head 18 moves along the Y-axis guide rail 34.

At the tip of the spindle 20, a tool 22, for example, an end mill, is attached. By making the tool 22 rotate while making the column 16, spindle head 18, and table 14 operate in the X-axis, Y-axis, and Z-axis directions, the workpiece W which is fastened to the table 14 is cut to a desired shape. When the NC rotary table is fastened, the numerical control machine tool 10 can be said to be a four-axis numerical control machine tool which also has a B-axis.

The numerical control machine tool 10 is provided with a numerical control unit 40 which controls the column 16, spindle head 18, and X-axis, Y-axis, and Z-axis feed servo motors Mx, My, and Mz which make the table 14 move in the X-axis, Y-axis, and Z-axis directions. When having an NC rotary table, a B-axis feed servo motor (not shown) is provided.

The numerical control unit 40 includes a program reader/interpreter 44 which reads the NC program 42 and interprets it, an interpreted program storage unit 46 which temporarily stores the interpreted program, a program execution command unit 48 which suitably pulls out a program from the interpreted program storage unit 46 and issues execution program data, a distributed control unit 50 which issues position command values, speed command values, and torque command values to the X-axis, Y-axis, and Z-axis, based on execution program data from the program execution command unit 48 and a servo controller 52 which issues torque command values or current command values to a feed axis motor drive unit 54 based on the position command values, speed command values, and torque command values from the distributed control unit 50 and the later explained feedback signal. Note that, for the B-axis as well, in the same way, the distributed control unit 50 issues position command values, angular speed command values, angular acceleration command values, etc. to the B-axis.

The feed axis motor drive unit 54 outputs current to drive the X-axis, Y-axis, and Z-axis feed axis motors (servo motors) Mx, My, and Mz based on the torque command values or current command values from the servo controller 52. Further, in the present embodiment, a processing control unit 56 is provided which corrects the torque command values or current command values from the servo controller 52 to the feed axis motor drive unit 54. The processing control unit 56 performs the role of performing the later explained modeling, calculation of control parameters, and other various processing.

Figure 2:
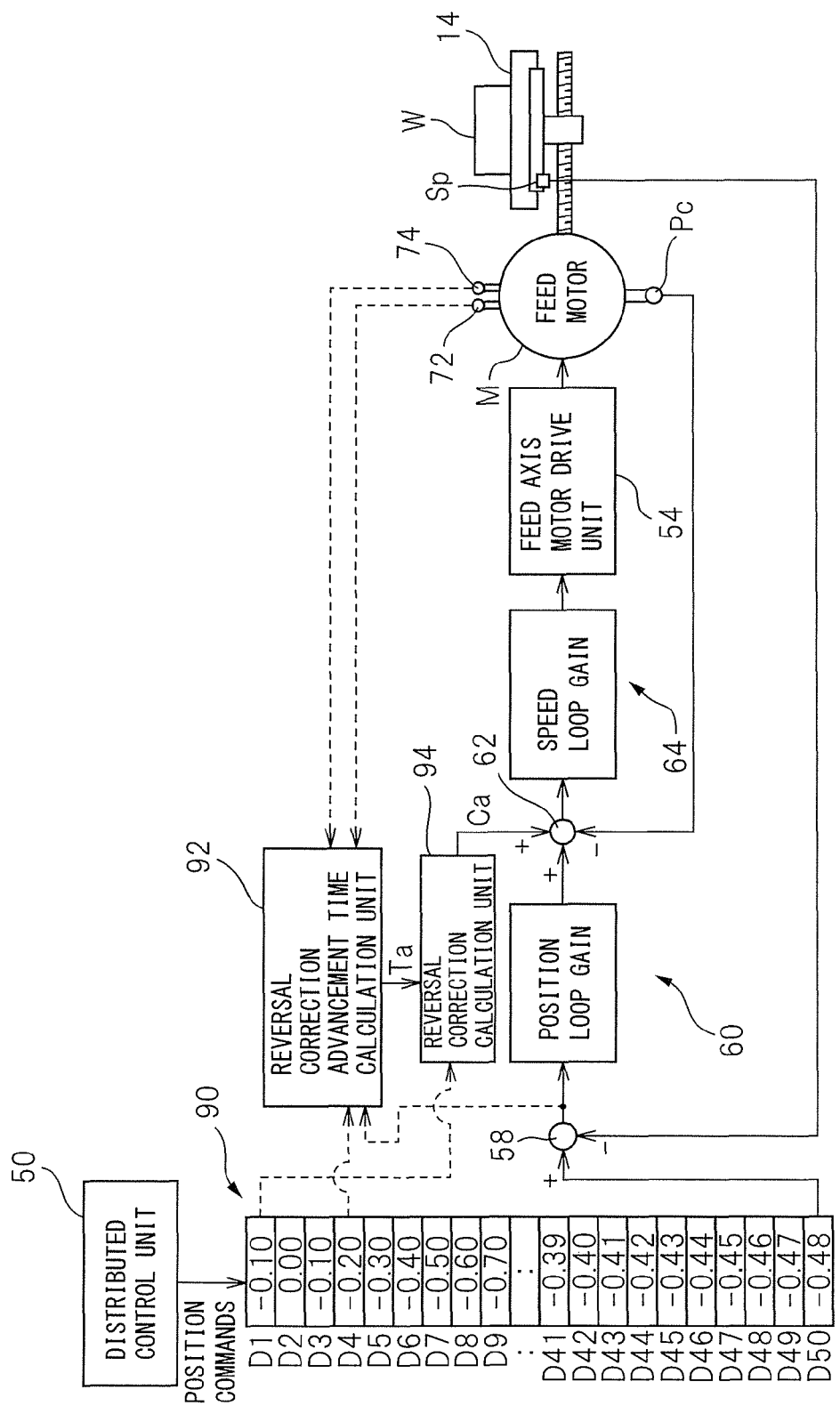
FIG. 2 is a block diagram of the configuration of a servo controller which controls the numerical control machine tool of the present invention.

FIG. 2 is a block diagram of the configuration of a servo control which controls a numerical control machine tool of the present invention. In the following description, only the feed control of the Z-axis for the table 14 will be explained, but it will be understood that the feed control of the X-axis, Y-axis, and B-axis is generally similarly configured.

As shown in FIG. 2, the servo controller 52 includes a subtractor 58 which compares position command values, speed command values, and acceleration command values from the position/speed/acceleration command distributed control unit 50 and a position feedback signal from a digital linear scale or other position detector SP which is attached to the table 14, a position control unit 60 which amplifies the output from the subtractor 58, a subtractor 62 which compares the output value of the position control unit 60 and a speed feedback signal from a pulse coder PC which is provided at the feed axis motor Mz, and a speed control unit 64 which amplifies the output of the subtractor 62.

As can be seen from FIG. 2, the position command for each control period which is supplied from the distributed control unit 50 is temporarily stored in a buffer 90 and is successively input to the subtractor 58. The buffer 90 which is shown in FIG. 2 has 50 columns D1 to D50. Each column stores a single position command. The current position command is the position command in the column D50, while the position commands in the columns D1 to D49 are future position commands. As can be seen from FIG. 2, in the next control period, the position commands of the columns D1 to D49 move respectively to the columns D2 to D50 and the position command in the column D50 is input to the subtractor 58. Further, a new position command is stored in the column D1. Such processing is performed for each control period, for example, for each 1 millisecond, whereby the position commands are successively input to the subtractor 58.

Further, the servo controller 52 includes a reversal correction advancement time calculation unit 92 which calculates an advancement time Ta for inputting a reversal correction command to the subtractor 62 and a reversal correction calculation unit 94 which calculates a reversal correction command Ca relating to backlash of the feed axis. Here, the "advancement time Ta" indicates the time for advancing the timing of input of the reversal correction command to the subtractor 62 from the time of reversal of the servo motor. Note that, at least one position command of the buffer 90 is input to the reversal correction advancement time calculation unit 92 and the reversal correction calculation unit 94. Further, as can be seen from FIG. 2, the torque of the feed axis motor M which is detected by the torque detection unit 72 and the current which flows through the feed axis motor M which is detected by the current detection unit 74 can be input to the reversal correction advancement time calculation unit 92.

FIG. 3 is a flow chart for explaining a correction method which corrects stick motion. Below, while referring to FIG. 2 and FIG. 3, correction of stick motion P in the present invention will be explained. First, at step S11, the position commands from the distributed control unit 50 are stored in the buffer 90 for each control period. As explained above, the buffer 90 includes a plurality of columns D1 to D50, so if the latest position command is stored in the column D1, the position commands which have been stored in the columns D1 to D49 move to the column D2 to column D50. Further, the position command of column D50 is used as the current position command.

Then, at step S12, the reversal correction calculation unit 94 calculates the reversal correction command Ca for correction of stick motion P using the position commands of the buffer 90. Note that, another method may also be used to prepare the reversal correction command Ca.

After that, at step S13, the reversal correction advancement time calculation unit 92 calculates the advancement time Ta using information which is obtained from operation of the feed axis motor M or the commands to the feed axis motor M. Here, the information which is obtained from the operation of the feed axis motor M or the commands to the feed axis motor M is, for example, acceleration of the feed axis motor M. The acceleration is calculated from at least three consecutive position commands which are stored in the buffer 90. Further, it is also possible to detect acceleration of the feed axis motor M from a not shown acceleration detector which is provided at the feed axis motor M.

FIG. 4 is a view which shows the relationship of the square root of acceleration and advancement time Ta. The square root of acceleration and advancement time Ta are related by the illustrated exponential function. Such a relationship is assumed to be found in advance by experiments etc. In the present invention, the advancement time Ta which corresponds to the square root of acceleration of the feed axis motor is found from the illustrated relationship. Alternatively, a map of the acceleration and advancement time such as shown in FIG. 5a and which is found in advance may be used as the basis to determine the advancement time Ta.

Finally, at step S14, the reversal timing at which the feed axis motor M reverses is found from the values of the position commands at the buffer 90. The reversal timing is the time when the sign of a position command switches. In FIG. 2, it is the timing of switching from the column D2 to the column D1. Therefore, the feed axis motor M reverses at the timing where the position command of column D1 is used as the actual position command. Such a reversal timing can be calculated using the number of predetermined control periods between the column D50 containing the current position command and the column D1 containing the position command at the time of reversal.

Figures 5D, 6:
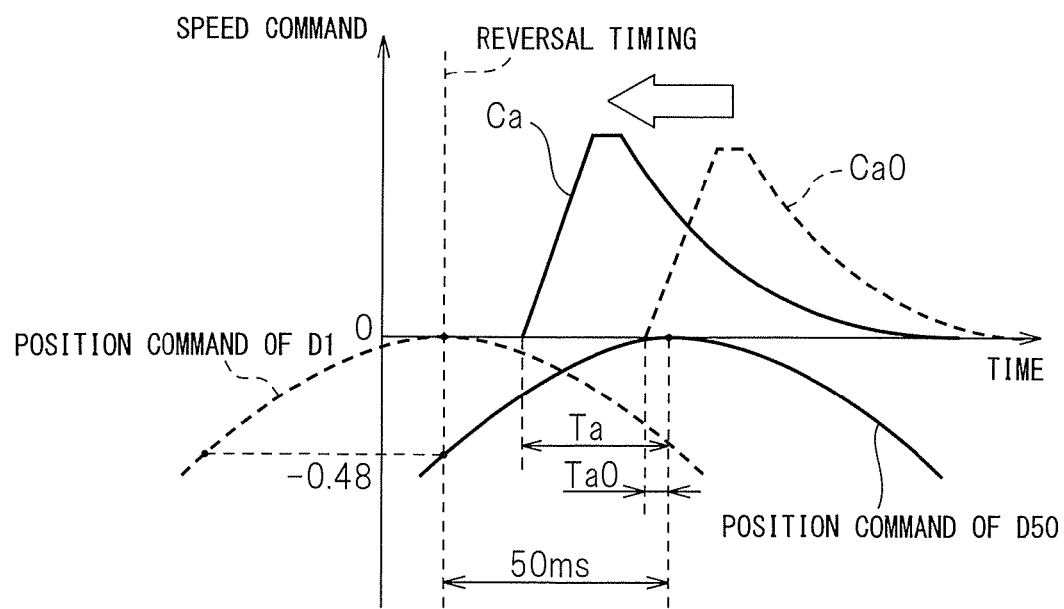
FIG. 5d is a view which shows a map of current error and advancement time.
FIG. 6 is a view which shows the relationship of a speed command and time.

Further, at the timing when advancing the reversal timing by exactly the advancement time Ta, the reversal correction command Ca is added to the subtractor 62. FIG. 6 is a view which shows the relationship between a speed command and time. In FIG. 6, a position command corresponding to the column D1 is issued when the feed axis motor M reverses. Further, FIG. 6 shows the reversal correction commands Ca0, Ca. One reversal correction command Ca0 is input right before the position command of the column D50 in the range of the control period. The advancement time Ta0 is too short and the stick motion P can only be partially eliminated.

On the contrary, the reversal correction command Ca of the present invention which is shown in FIG. 6 is input earlier by exactly the advancement time Ta. The advancement time Ta is sufficiently longer than the advancement time Ta0, so the speed command is corrected early enough by the reversal correction command Ca and as a result stick motion P can be substantially completely eliminated. Note that, in the embodiment which is explained with reference to FIG. 2 etc., the reversal correction command Ca is added to the speed command, but a similarly separately prepared reversal correction command Ca may also be added to the torque command.

In this way, in the present invention, on the basis of information obtained from operation of the servo motor, for example, acceleration, the advancement time Ta is calculated. The reversal correction command Ca is added at a timing considering the advancement time Ta. Further, the advancement time Ta is determined without depending on the control period of the numerical control machine tool 10, so it is possible to prepare an advancement time Ta considerably longer than the control period, for example, an advancement time Ta of a length of several tens of times the control period. Therefore, it becomes possible to set the timing for addition of the correction command to be early enough. For this reason, in the present invention, it is possible to correct the stick motion P by a high precision and as a result possible to raise the quality of the machined surface of the workpiece W.

Further, FIG. 5b is a view similar to FIG. 5a but showing a map of the position error and advancement time. Here, the position error ΔP in FIG. 5b is the error between the position of the feed axis motor M which is detected by the position detector Sp and the position command which is output from the distributed control unit 50. In the present invention, this position error ΔP can also be used as information obtained from the operation of the servo motor.

In other words, the advancement time Tb is determined from the position error ΔP by using the map of FIG. 5b and the advancement time Tb is used instead of the advancement time Ta. Such an advancement time Tb which is found from the position error ΔP is a value sufficient for eliminating the effects of lost motion. Therefore, it will be understood that the more suitable advancement time Tb is found and as a result stick motion P can be corrected with a high precision and the quality of the machined surface of the workpiece W can be further raised.

Further, FIG. 5c is a view which shows a map of the torque error and the advancement time. It is also possible to calculate the torque error Δτ between the torque command from the distributed control unit 50 and the actual torque which is detected by the torque detection unit 72 and to find the advancement time Tc from a predetermined map based on the torque error Δτ. Further, FIG. 5d is a view which shows a map of the current error and the advancement time. It is also possible to calculate a current error ΔI between a current command from the distributed control unit 50 and the actual current which is detected by the current detection unit 74 and to find the advancement time Td from a predetermined map based on this current error ΔI.

These advancement times Tc, Td may be used instead of the advancement time Ta. Alternatively, it is possible to calculate the average value of at least one of these advancement times Tc, Td and the advancement time Ta and use that average value as a new advancement time. In such a case, it will be understood that a more accurate advancement time which considers the torque error Δτ and/or current error ΔI can be found. Note that, it is also possible to use another method to adjust the advancement time Ta by at least one of the advancement times Tc, Td. Such a case as well is included in the scope of the present invention.

REFERENCE SIGNS LIST 10 numerical control machine tool
14 table
16 column
20 spindle
22 tool
24 feed screw
26 nut
28 Z-axis guide rail
36 X-axis guide rail
40 numerical control unit
42 NC program
44 program reader/interpreter
46 interpreted program storage unit
48 program execution command unit
50 distributed control unit
52 servo controller
54 feed axis motor drive unit
60 position control unit
62 subtractor
64 speed control unit
72 torque detection unit
74 current detection unit
90 buffer (storage unit)
92 reversal correction advancement time calculation unit
94 reversal correction calculation unit

The invention claimed is:

1. A stick motion correction method which corrects stick motion which occurs at the time of reversal of a movement direction of a feed axis of a numerical control machine tool, which stick motion correction method comprising steps of:
storing a plurality of position commands to be commanded to a servo motor of the feed axis in a storage unit from an NC program of said numerical control machine tool for each of a plurality of predetermined control periods from a current position command to a latest position command of said plurality of position commands;
calculating reversal correction commands based on the stored plurality of position commands;
finding in advance a relationship between advancement time values and acceleration values each of which is found from at least three of said plurality of position commands which are stored in said storage unit,
wherein the advancement time values can be used for advancing a timing of addition of said reversal correction command to a speed command or the torque command of said servo motor from the reversal timing of said servo motor;
determining an advancement time using said relationship and corresponding to an acceleration value which is found from at least three of said plurality of position commands which are stored in said storage unit,
at the time of reversal of the movement direction, if the reversal of the movement direction is found from values of the position commands, which are stored in the storage unit, using said relationship, when the feed axis moves actually; and
finding a timing advanced from the reversal timing of said servo motor by exactly said advancement time based on the number of control periods and the columns of the storage unit and adding said reversal correction command at the timing to the speed command or the torque command of said servo motor to correct stick motion.

* * * * *